… …

United States Patent Office 2,953,541
Patented Sept. 20, 1960

2,953,541

COMPOSITION OF POLYETHYLENE AND A COPOLYMER OF ETHYLENE AND ETHYL ACRYLATE

Richard J. Pecha, New Brunswick, Herbert Samuels, Somerville, and David C. Kay, Franklin Township, Somerset County, N.J., assignors to Union Carbide Corporation, a corporation of New York No Drawing. Filed June 16, 1958, Ser. No. 742,036

3 Claims. (Cl. 260—45.5)

This invention relates to polyethylene compositions. More particularly, this invention relates to polyethylene compositions containing a copolymer of ethylene and ethyl acrylate which are particularly suitable for use in the manufacture of shaped articles, such as containers, flat films, tubular conduits and the like.

Polyethylene which is otherwise desirable for the manufacture of shaped articles of relatively light weight having excellent flexibility over a wide range of temperatures and exhibiting chemical inertness toward aqueous and nonaqueous liquids has been found deficient in that shaped articles manufactured therefrom are susceptible to environmental stress cracking. That is, shaped polyethylene articles have a tendency to crack and rupture when subjected to stress in the presence of certain environments.

Shaped articles manufactured from polyethylene normally contain internal strains which are produced in the article during the forming operation as, for example, the molding or extrusion operation and also during any subsequent operation on the shaped articles, such as a stretching or machining operation. These internal strains in themselves are often sufficient to cause the shaped article to crack and rupture on being subjected to external stress. Generally, however, cracking and rupturing most often occurs when the shaped polyethylene is subjected to a stress, for example, a bending or other such deformation, in the presence of certain environments. As an illustration, cracking and rupturing of polyethylene articles has been found to occur in those applications wherein the shaped article is subjected to a stress in the presence of surface active agents, such as soaps and detergents; also in the presence of alcohols, polyglycol ethers, silicon fluids and various other aliphatic and aromatic hydrocarbons.

Environmental stress cracking has been reported as occurring in the wire and cable industry whenever polyethylene cables are lubricated with soaps or detergents prior to being pulled through conduits. The packaging industry has also reported the failure of polyethylene or polyethylene coated containers as the packaging means for surface active agents due to cracking and rupturing. In addition, polyethylene piping and tubing have been found to crack while under stress when in contact with a surface active agent.

Stress cracking is particularly undesirable as it severely shortens the useful life of the polyethylene article. An article once cracked and ruptured is, for all practical purposes, rendered useless.

An additional shortcoming of polyethylene has been the tendency of shaped articles, particularly injection molded polyethylene articles manufactured therefrom to "skin." "Skinning" is the term most commonly used to refer to the undesirable separation or delamination of a surface layer or "skin" from the remainder of the piece. Many expedients have been proposed in order to overcome environmental stress cracking and also skinning of shaped polyethylene articles but none has resulted in a satisfactory solution. Of the various expedients proposed none have eliminated environmental stress cracking and skinning of shaped polyethylene articles without detracting from the otherwise desirable properties of polyethylene.

We have now found that compositions of polyethylene containing a copolymer of ethylene and ethyl acrylate are particularly suitable for the manufacture of shaped articles which are highly resistant to stress cracking, and are less prone to "skin." In addition, compositions comprising a blend of polyethylene and a copolymer of ethylene and ethyl acrylate are extremeley desirable, as shaped articles manufactured therefrom exhibit excellent gloss characteristics and possess improved toughness.

Improved toughness is a particularly important consideration in the manufacture of shaped articles by injection molding of highly rigid polyethylene compositions, that is, compositions having a one percent secant modulus of at least about 100,000 p.s.i. Heretofore known, highly rigid polyethylene compositions, because of their inherent poor toughness characteristics, are generally unacceptable for use in the manufacture of large and/or heavy walled injection molded articles. Large and/or heavy walled articles which are injection molded from previously known, highly rigid polyethylene compositions crack and fracture on receiving an impact blow at the general area of their sprue. By contrast, large and/or heavy wall injection moldings manufactured from the compositions of this invention, irrespective of the rigidity of the composition, can absorb repeated blows at the area of their sprue location without discernible ill effects.

The addition of the ethylene-ethyl acrylate copolymer to the polyethylene can be accomplished in any convenient manner so long as there is attained a thorough distribution of the copolymer throughout the polyethylene. For example, the components can be mixed together in a ribbon blender, a Hobart mixer, paddle blender and the like.

It is preferred to conduct at least a portion of the mixing at a temperature sufficiently high to flux the components in order to produce a blend of better uniformity and greater homogeneity. The hot mixing can be satisfactorily carried out in a Banbury mixer, on a two-roll mill, in a compounding extruder or other such apparatus. Also, a portion of the mixing sequence can be combined with the shaping or forming operation as, for example, by accomplishing the final mixing in the barrel of the forming extruder or in the cylinder of the injection molding apparatus.

The ethylene-ethyl acrylate copolymer is added to the polyethylene in amounts ranging from about 20 percent to about 80 percent by weight based on the total weight of the ethylene-ethyl acrylate copolymer and the polyethylene. It has been found that within this specified range, the polyethylene compositions possess all the desirable attributes previously discussed.

The copolymers which are added to polyethylene to produce the compositions of this invention are the normally solid copolymers of ethylene and ethyl acrylate containing at least about 2 percent by weight combined ethyl acrylate and preferably not in excess of about 25 percent by weight combined ethyl acrylate. Particularly desirable copolymers of ethylene and ethyl acrylate for purposes of this invention are those wherein the percent by weight combined ethyl acrylate is from about 3 to about 15 percent. A copolymer having a combined ethyl acrylate content of about 3 to about 15 percent by weight has been found particularly effective in increasing the stress cracking resistivity and reducing the skinning tendencies of polyethylene. Combined ethylacrylate content is conveniently determined by a standard infra-red analysis. Suitable copolymers have densities from about 0.91 to about 0.94 gram per cc. at 23° C.

The particular method by which the ethylene-ethyl acrylate copolymers are produced is not particularly critical. Any process can generally be employed wherein the polymerization is carried to a relatively high conversion of monomers to polymers. An especially desirable method is one in which the copolymer is produced continuously in a tubular reactor by charging the ethylene and ethyl acrylate into one end of the reactor and withdrawing the product from the other end. Accordingly, ethylene-ethylacrylate copolymers which are suitable for modifying polyethylene according to this invention are conveniently prepared by copolymerizing in a tubular reactor and in the presence of a polymerization catalyst, ethylene with from about 0.1 mole to about 1.5 moles and preferably 0.2 to about 0.7 mole of ethyl acrylate per 100 moles of ethylene under pressures ranging from about 20,000 p.s.i. to about 40,000 p.s.i. and higher and at temperatures from about 100° C. to about 350° C. The concentration of the reaction catalyst can be varied from about 0.001 to about 5 mole percent based on the total weight of the monomers charged.

A detailed explanation of particularly suitable ethylene-ethyl acrylate copolymers and a method for the production thereof is to be found in copending application Serial No. 742,389, filed concurrently herewith by Wayne G. White which is incorporated herewith by reference.

The polyethylenes which are modified by the addition of the ethylene-ethyl acrylate copolymers according to the present invention are the normally solid polyethylene products. Normally solid polyethylenes have molecular weights ranging from about 2,000 to 40,000 and higher (determined by a solution viscosity average molecular weight method described by Kemp and Peters, "Industrial and Engineering Chemistry," volume 34, page 1097, also volume 35, page 1108) and are characterized by inherent flexibility, inertness to most environments and by outstanding dielectric properties.

If desired, more than one polyethylene and also more than one ethylene-ethyl acrylate copolymer can be blended together to produce the compositions of this invention. For example, the admixture of a low and high density polyethylene with an ethylene-ethyl acrylate copolymer or ethylene-ethyl acrylate copolymers having a different ethyl acrylate content is sometimes advantageous in that the plasticity of the resultant composition, the rigidity and other properties of the shaped articles produced therefrom can be conveniently varied and balanced as desired.

It is preferred to select the components whereby the resultant composition has a one percent secant modulus of at least about 15,000. Shaped articles produced from a composition having a one percent secant modulus less than about 15,000 p.s.i. are generally too flexible for any practical use.

In further explanation of one percent secant modulus, it is the modulus of elasticity in tension calculated from the stress/strain ratio of one percent elongation. The test procedure for determining the one percent secant modulus is described in ASTM–D–638–56T and a full definition of secant modulus appears in paragraph 34 of the appendix to the aforementioned ASTM test description.

The polyethylene compositions of this invention may also contain various additives, for example, to plasticize, to stabilize, to lubricate, to prevent oxidation and to lend color to the compositions. Such additives are well known and may be added to the compositions of this invention in convenient amounts, as is known by those skilled in the art, without significantly detracting from the beneficial properties imparted by the ethylene-ethyl acrylate copolymers. Illustrative of such additives are substituted phenols, thio bisphenols, aromatic amines, dyes, pigments, carbon black, ultra-violet light absorbents, fatty acid amides, waxes, clays, alkaline earth carbonates, rubber and the like.

The polyethylene compositions of this invention containing ethylene-ethyl acrylate copolymers, were formulated, tested and compared with unmodified polyethylene. The methods of formulation, tests and test results are noted below. It is to be noted that the test results clearly indicate the high resistivity to stress cracking, resistance to skinning, excellent gloss characteristics and high toughness possessed by the compositions of this invention.

Each of the compositions noted in Examples 1, 2, 3 and 4 was processed in the following manner: each unmodified polyethylene and each modified polyethylene, containing a copolymer of ethylene and ethyl acrylate, were mixed, fluxed and compounded from about 5 to 10 minutes in a Banbury mixer under a ram pressure of 60 p.s.i. Cooling water was circulated through the Banbury rotor and jacket. The temperature of the mass rose gradually to between 115–150° C. during the 5 to 10 minute interval. The hot mass was sheeted and milled for about 3 minutes on a two-roll mill wherein the front roll was at a temperature of between 100–140° C. and the back roll was at a temperature of from between 90–130° C. The mass was then passed through a 4-roll L type calender to form a sheet. The offset roll of the calender was at a temperature of between 90–130° C., and the bottom and middle rolls of the calender were at a temperature of between 95 to 135° C. The sheet was passed through a water trough wherein the water was at a temperature of about 25° C., air dried and diced. The dice were then compression molded into 8 inch square plaques having a thickness of 0.075 inch.

The plaques were then die cut and used in various test procedures which are described below:

*Minimum non-skinning temperature.*—A series of rectangular plaques were prepared by an injection molding operation at a succession of stock temperatures ranging from about 350° F. to about 550° F. The plaques were 5⅜ inches in length, 1¾ inches in width. The center section of each plaque had one recessed surface having the following dimensions: 0.030 inch thick, ⅝ of an inch in length and 1¾ inches wide. The end sections of each plaque had the following dimensions: 0.070 of an inch thick, 2⅜ inches in length and 1¾ inches wide. In conducting the test each plaque was folded at the center and sharply flexed about 30 times. The recessed center section was then pierced to a point just below the surface skin and an effort was made to manually peel or delaminate the surface skin starting from the point at which the skin was pierced. The lowest molding temperature which yielded plaques which could not be "skinned" or delaminated was designated as the "Minimum non-skinning temperature."

*Minimum "gloss" temperature.*—Plaques were injection molded as described in the "Minimum non-skinning temperature" test and examined visually. The minimum "gloss" temperature is the minimum temperature at which no "chatter" marks appear in and at the surface of the finished piece. "Chatter" marks are areas appearing in and at the surface of the finished piece which appear as a series of alternate smooth and rough bands running transverse to the direction of flow of the plastic material as it was forced into the shaping mold.

*Stress cracking resistance.*—Specimens were die cut from plaques which were molded at 500° F. These plaques are more fully described in the "Minimum non-skinning temperature" test. Each specimen was 1.5 inches in length, 0.5 of an inch in width and 0.07 of an inch thick. The specimens were tested by the method described in ASTM Bulletin of December 1956, pages 25–26 with the following exceptions: (1) 20 specimens were used in each test instead of 10; (2) the specimens were preconditioned for 48 hours at 23° C. and 50 percent relative humidity, but were not slit before immersion into Igepal; (3) $F_{20}$, $F_{50}$ and so forth refer to the time at which the indicated percent of the specimens under test fail. The numerals refer to the actual percent. The percent failure was determined from a curve of percent of specimens failing versus the immersion time. $F_0$, or time to zero percent failure, in the time at which the first failure of any of the test specimens occurred.

"Igepal" as used herein refers to Igepal CA-630, a surface active agent comprising essentially iso-octyl phenoxy polyoxyethylene ethanol and manufactured by the General Aniline and Film Corporation.

"Igepal" refers to 100 percent pure product, whereas dilute Igepal indicates a 0.2 percent by weight Igepal in water.

Igepal is known to produce rapid cracking in stressed polyethylene.

*Stress cracking resistance-dishpan test.*—A dishpan having a length of 9⅜ inches, a width of 11¼ inches and being 5 inches deep was molded under the following conditions:

Stock temperature _____ °F__ 500
Mold temperature _____ °F__ 110
Dwell time _____ seconds__ 15
Cool time _____ do____ 45
Overall cycle _____ do____ 72

The dishpan was inverted and a 0.5 inch diameter steel ball placed on the sprue of the dishpan and taped in place. Dishpans were turned right side up and placed on a flat surface with the ball remaining in the position indicated. One gallon of detergent solution was poured into the dishpan which was thereafter examined visually for cracks. The time in hours at which the first crack or any magnitude appeared was recorded. The detergent solution contained 35 cc. of a liquid detergent called "Trend" which is an alkali metal salt of acid stock of sulfonated and sulfated organic compounds having aliphatic radicals containing from 8 to 18 carbon atoms (cf. U.S. patents to Alan C. Stoneman 2,613,218, issued October 7, 1952, and Re. 23,774, issued January 12, 1954) and manufactured by the Purex Corp., Ltd. The test was conducted at room temperature.

Physical properties of compositions which were tested and methods of determining the physical properties are indicated below:

*Melt index.*—ASTM-D-1238-52T reported as decigrams per minute.

*Density.*—Measured as grams per cubic centimeter at 23° C. in a density gradient column equivalent to that described in the Journal of Polymer Science, volume 21, page 144, 1956.

*Tensile strength, p.s.i.*—ASTM-D-638-56T.

*Ultimate elongation percent.*—ASTM-D-638-56T.

*Secant modulus, p.s.i at 1% elongation.*—ASTM-D-638-56T.

*Brittle temperature in ° C.*—ASTM-D-746-55T with the exception that the temperature at which 80% of the samples passed was recorded.

EXAMPLE I

Composition A 30 parts by weight of a polyethylene having a melt index of 20 and a density of 0.925.

70 parts by weight of an ethylene-ethyl acrylate copolymer containing about 4 percent by weight combined ethyl acrylate and having a melt index of 4.5 and a density of 0.921.

Composition B 40 parts by weight of a polyethylene having a melt index of 2 and a density of 0.950.

5 parts by weight of a polyethylene having a melt index of about 20,000 and a density of 0.88.

50 parts by weight of an ethylene-ethyl acrylate copolymer containing about 11 percent by weight of combined ethyl acrylate and having a melt index of 5 and a density of 0.926.

5 parts by weight of an ethylene-ethyl acrylate copolymer containing about 8 percent by weight of combined ethyl acrylate and having a melt index of 14 and a density of 0.928.

Control I: polyethylene having a melt index of 6 and a density of 0.916.

|  | Control | Composition A | Composition B |
|---|---|---|---|
| Melt Index | 6 | 9 | 6 |
| Density | 0.916 | 0.924 | 0.932 |
| Secant Modulus, p.s.i. | 23,700 | 17,000 | 45,000 |
| Minimum Non-Skinning Temp., °F | 550 | 450 | 525 |
| Minimum Gloss Temp., °F | 525 | 425 | 400 |
| Stress Cracking Resistance (Dishpan Test), hrs. to failure | 5 | 31 | 48 |

The tabulated results of Example I clearly indicate the high resistance to stress cracking and resistance to skinning possessed by the compositions of this invention. In addition, the tabulated results show the desirable "gloss" characteristics of the compositions of this invention indicated by low minimum "gloss" temperatures. "Gloss" characteristics are extremely important, for compositions possessing good "gloss" characteristics can be molded at lower temps. and consequently in faster molding cycles which is an important economic consideration in molding applications.

EXAMPLE II

Control II: a polyethylene having a melt index of 20 and a density of 0.925.

Control III: a polyethylene having a melt index of 2 and a density of 0.950.

Composition A: described in Example I.
Composition B: described in Example I.

|  | Control II | Control III | Composition A | Composition B |
|---|---|---|---|---|
| Stress Cracking (Dishpan Test), hrs. to failure | 7 | 8 | 31 | 48 |

EXAMPLE III

Composition C 20 parts by weight of polyethylene having a density of 0.925 and a melt index of 20.

80 parts by weight of an ethylene and ethyl acrylate copolymer containing about 4 percent by weight of combined ethyl acrylate and having a density of 0.921 and a melt index of 4.5.

Composition D 30 parts by weight of a polyethylene having a density of 0.925 and a melt index of 20.

70 parts by weight of a copolymer of ethylene and ethyl acrylate containing about 12 percent by weight combined ethyl acrylate and having a density of 0.927 and a melt index 1.8.

Control IV: polyethylene having a density of 0.925 and a melt index of 20.

|  | Control IV | Composition C | Composition D |
|---|---|---|---|
| Melt Index | 20 | 8.1 | 4.3 |
| Stress Cracking Resistance, hrs. in Igepal at 50° C.: |  |  |  |
| $F_9$ |  |  | >504 (All tests were discontinued; no specimens cracked). |
| $F_{50}$ |  |  | 1.7 |
| $F_{80}$ | less than 0.17 |  | 6 |

As can be seen from the tabulated data of Example III, 80 percent of the control specimens failed in less than 0.17 hour. Specimens manufactured from the compositions of this invention again exhibited high resistance to stress cracking.

EXAMPLE IV

*Composition E*

30 parts by weight of polyethylene having a density of 0.950 and a melt index of 2.

70 parts by weight of a copolymer of ethylene-ethyl acrylate having a combined ethyl acrylate content of about 22 percent by weight and a density of 0.930 and a melt index of 14.

*Composition F*

The same as Composition E with the exception that the ratio of polyethylene to ethylene-ethyl acrylate copolymer was 25 parts by weight polyethylene and 75 parts by weight of ethylene-ethyl acrylate copolymer.

|  | Composition E | Composition F |
| --- | --- | --- |
| Melt Index | 7.6 | 10 |
| Secant Modulus, p.s.i | 28,200 | 19,500 |
| Tensile Strength, p.s.i | 1,300 | 1,160 |
| Elongation, Percent | 300 | 600 |
| Brittle Temp. in ° C | −95 | −105 |
| Minimum "Gloss" Temp. in ° F | 425 | 400 |
| Stress Cracking in hrs. in Igepal at 50° C.: | | |
| $F_{50}$ | 168 | 168 |
| in dilute Igepal at 23° C.: | | |
| $F_{20}$ | 15 | 16 |
| $F_{45}$ | 192 | 192 |

The tabulated results again show the excellent resistance of stress cracking and excellent gloss characteristics possessed by the compositions of this invention. In addition, the tabulated data show that when a copolymer of ethylene and ethyl acrylate is added to polyethylene, the polyethylene retains its relative freedom from brittleness at low temperatures. The excellent Brittle Temperature values indicate that the ethylene-ethyl acrylate copolymer does not detract from the flexibility and impact strength of polyethylene at low temperatures.

EXAMPLE V

A mixture, designated as Composition G comprising 75 parts by weight of a polyethylene having a density of 0.960 and a melt index of 3.5, and 25 parts by weight of an ethylene-ethyl acrylate copolymer containing about 11% by weight of combined ethyl acrylate and having a density of 0.927 and a melt index of 3 was mixed, fluxed and compounded in a Banbury mixer for seven minutes under a ram pressure of 60 p.s.i. During this period, the temperature of the mass increased gradually to about 150° C. The hot mass was discharged from the Banbury, milled 5 minutes, and sheeted on a two-roll mill whose front and back rolls were maintained at 120° C. and 115° C. respectively. The sheet was then air-cooled and granulated.

For comparison purposes, two commercially available polyethylenes were compounded in the same manner; polyethylene having density of 0.960 and a melt index of 3.5 and designated as Control V; and polyethylene having a density of 0.950 and melt index of 2 and designated as Control VI. All three products were then molded and tested by the methods previously described. The results are shown in the following table:

|  | Control V | Control VI | Composition G |
| --- | --- | --- | --- |
| Melt Index | 3.5 | 2 | 3.7 |
| Density | 0.960 | 0.950 | 0.952 |
| Secant Modulus p.s.i | 150,000 | 100,000 | 100,000 |
| Minimum Non-Skinning Temp. in ° F | >550 | >550 | >500 |
| Minimum Gloss Temp. in ° F | 600 | 550 | 525 |

Additionally, each of the foregoing materials was injection molded into 10 inch, ungrooved phonograph records 0.075" thick, in a center gated mold using the following molding conditions.

| | |
| --- | --- |
| Stock temperature ° F | 500 |
| Mold temperature ° F | 110 |
| Dwell time seconds | 40 |
| Cool time do | 10 |
| Overall cycle do | 60 |

The records were then struck sharply, sprue down, against the corner of a desk top.

Those made from both control materials cracked open through the sprue mark after the 6th blow. Records made of Composition G, did not crack even after 10 blows.

Dishpans molded as described in the "Dishpan cracking test" were also prepared from the aforementioned compositions and the dishpans struck sharply at their sprue. Dishpans produced from the control materials, Control V and Control VI, cracked after the first blow. Dishpans made from Composition G withstood 10 blows without a single failure.

The data noted above wherein the test pieces were struck sharply, clearly indicates that the pieces made from the compositions of this invention had a much greater toughness than pieces made from unmodified polyethylene.

The compositions of this invention are particularly useful for the manufacture of injection molded articles, such as housewares, machine guards and the like. These compositions can be compression molded or extruded and are particularly useful for extrusion coating applications and can, in general, be formed, fabricated and used advantageously and for the same purposes as prior art polyethylene compositions of comparable melt index and rigidity.

What is claimed is:

1. A composition comprising a normally solid polyethylene and a copolymer of ethylene and ethyl acrylate, said copolymer containing from about 2 to about 25 percent by weight combined ethyl acrylate and being present in said composition in an amount of from about 20 to about 80 percent by weight.

2. A composition as defined in claim 1 wherein said composition has a one percent secant modulus of at least about 15,000 p.s.i.

3. A composition comprising a normally solid polyethylene and a copolymer of ethylene and ethyl acrylate, said copolymer containing from about 3 to about 15 percent by weight combined ethyl acrylate and being present in said composition in an amount of from about 20 to about 80 percent by weight.

References Cited in the file of this patent

UNITED STATES PATENTS 2,542,771  Hanford  Feb. 20, 1951